Figure 1:
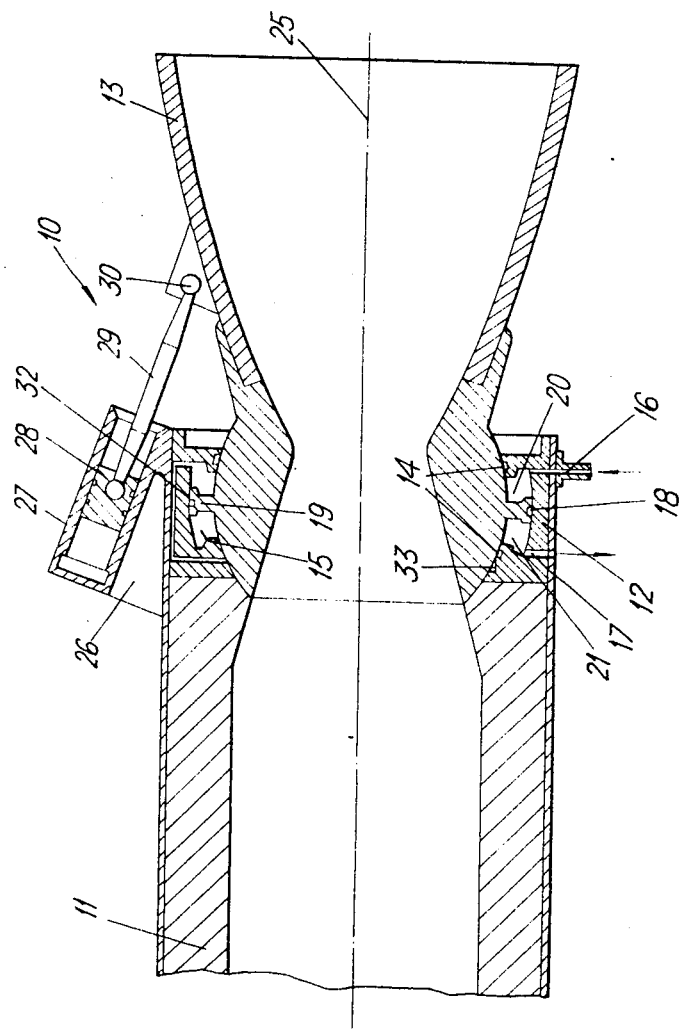

United States Patent
Oldfield et al.

[15] 3,659,788
[45] May 2, 1972

[54] JET NOZZLE ASSEMBLY

[72] Inventors: Harry Oldfield, Coventry; Gordon Terry Healey, Staverton, Nr. Daventry; John Anthony Ridgway, Hinckley, all of England

[73] Assignee: Rolls-Royce Limited, Derby, England

[22] Filed: Oct. 14, 1970

[21] Appl. No.: 80,738

[30] Foreign Application Priority Data

Oct. 23, 1969 Great Britain......................52,044/69

[52] U.S. Cl....................................239/127.1, 239/265.35
[51] Int. Cl......................................B64d 33/04, B64c 15/04
[58] Field of Search....................................239/127.1, 265.35

[56] References Cited

UNITED STATES PATENTS

| | | | |
|---|---|---|---|
| 3,401,887 | 9/1968 | Sheppard | 239/265.35 |
| 3,049,877 | 8/1962 | Sherman | 239/265.35 X |
| 3,048,010 | 8/1962 | Ledwith | 239/265.35 |
| 3,182,452 | 5/1965 | Eldred | 239/265.35 X |
| 3,208,215 | 9/1965 | Brown | 239/265.35 |
| 3,230,708 | 1/1966 | Huang et al. | 239/265.35 X |
| 3,446,437 | 5/1969 | McCullough et al. | 239/265.35 |

*Primary Examiner*—M. Henson Wood, Jr.
*Assistant Examiner*—Edwin D. Grant
*Attorney*—Cushman, Darby & Cushman

[57] ABSTRACT

A jet nozzle assembly comprises a housing having a curved bearing surface which provides a seating for a complementary surface of a universally swivellable nozzle member through which in operation a propulsive jet may flow, an actuator for causing swivelling of the nozzle member relative to the housing, a conduit for supplying a cooling and/or lubricating fluid to the surfaces, a flange member secured to the nozzle member, and pressure responsive assembly for applying, in operation, hydrostatic pressure to the flange member so as to reduce or eliminate frictional opposition to its swivelling movement due to said propulsive jet.

10 Claims, 5 Drawing Figures

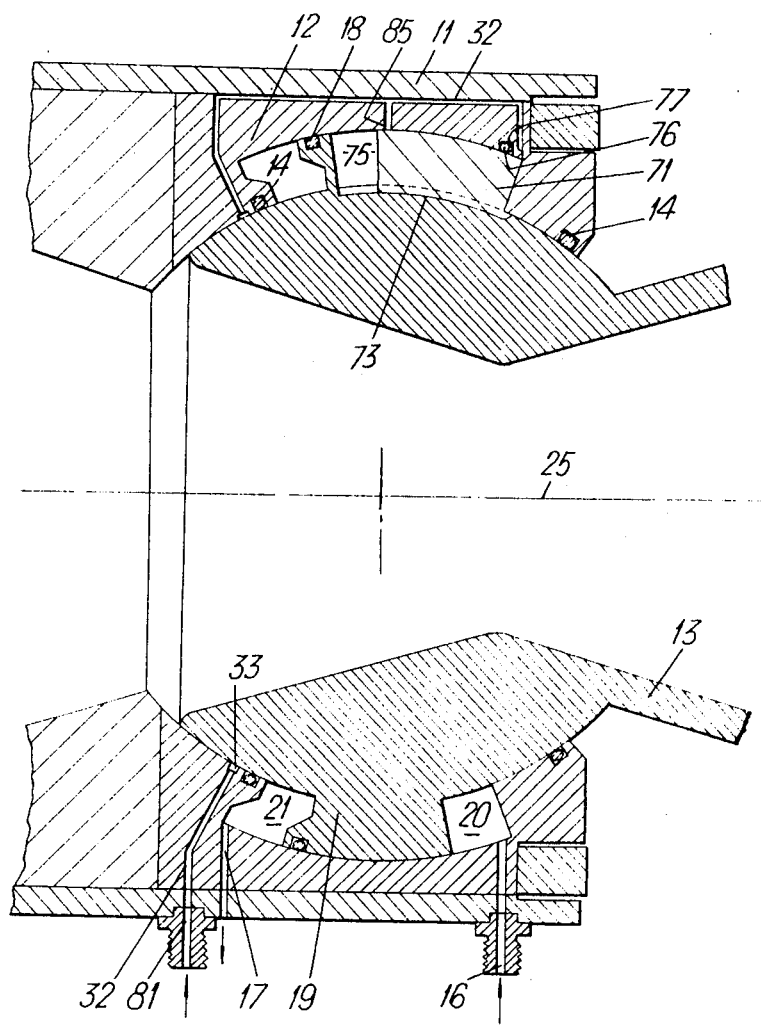

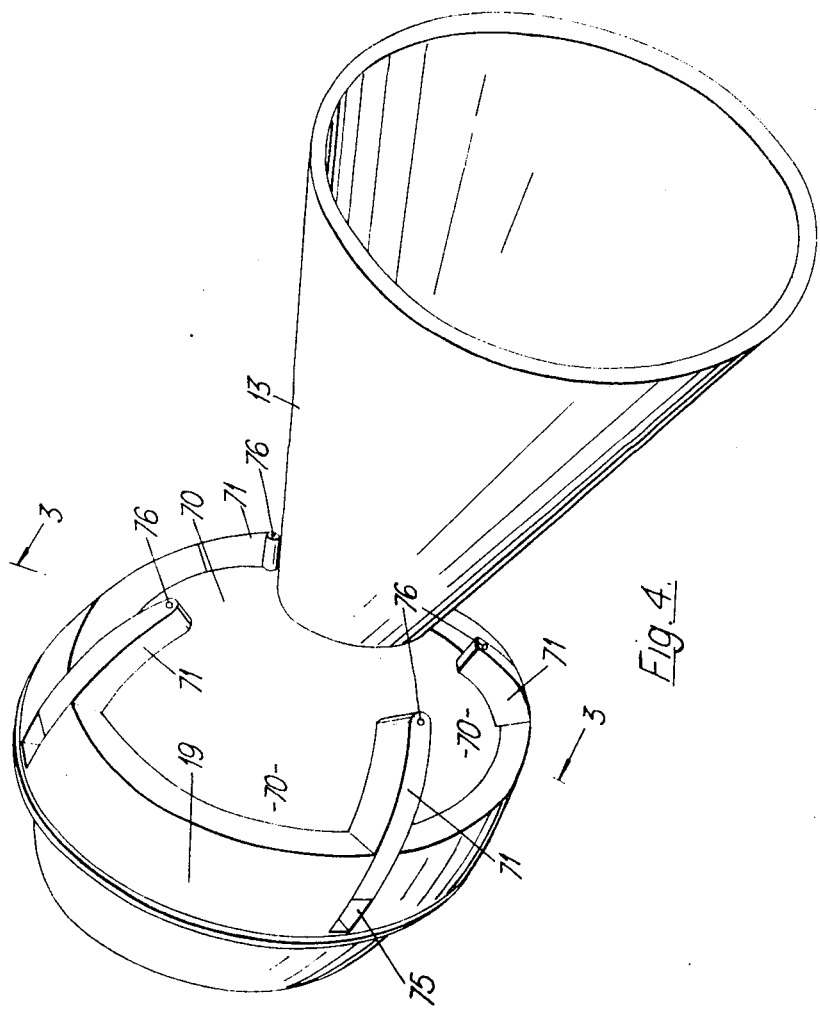

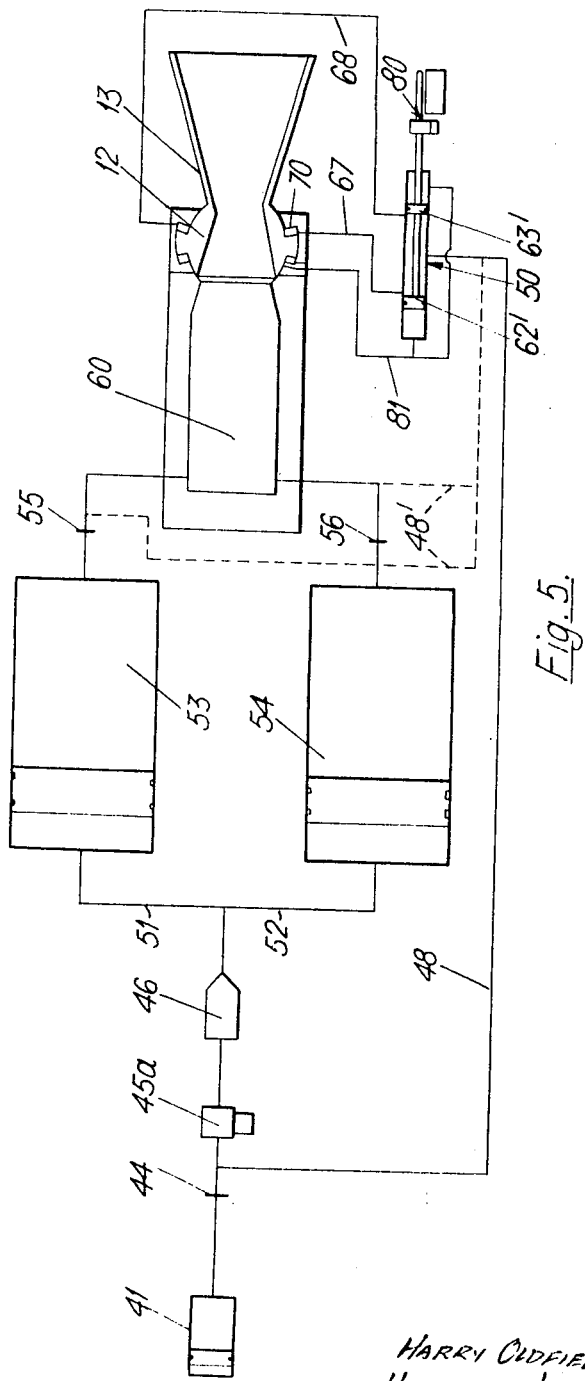

JET NOZZLE ASSEMBLY

This invention relates to improvements in jet nozzle assemblies, and although it is not so restricted, it will be particularly described with reference to a swivelling nozzle for a rocket engine.

The problems associated with high operating temperatures and pressures due to the propulsive jet within the housing and the nozzle in a rocket engine make the practical realization of a universally swivelling nozzle very difficult. The present invention seeks to provide a nozzle capable of being universally swivelled and operated; under conditions of high temperature and pressure by means which does not unduly increase the overall weight of the engine, which occupies relatively little space and which requires relatively little power.

According to the present invention, there is provided a jet nozzle assembly comprising a housing having a curved bearing surface which provides a seating for a complementary surface of a universally swivellable nozzle member through which in operation a propulsive jet may flow, sealing means between the said surfaces, actuating means for causing swivelling of said nozzle member relative to said housing, conduit means for supplying coolant and/ or lubricant to said surfaces and pressure responsive means for applying, in operation, hydrostatic pressure to a part secured to said nozzle member so as to reduce or eliminate frictional opposition to its swivelling movement due to said propulsive jet.

Preferably, said pressure-responsive means includes an annular flange on said nozzle member, which flange is in sealing and sliding engagement with a cavity defined in said bearing surface so as to divide said cavity into two annular chambers, and means for supplying pressure fluid to one of said chambers.

The pressure fluid preferably serves as a coolant and/ or lubricant as well, the said conduit means receiving its supply of pressure fluid from said one chamber.

Said actuating means may include at least one ram connected to said nozzle member.

The or each ram may be pressurized by said pressure fluid.

In one preferred embodiment of the present invention, said one annular chamber is divided into a plurality of equi- angularly spaced apart segments separated by respective walls each of which is pivotally connected to said housing and connected to said flange so as to be slidably movable relative thereto, the said segments defining therebetween pressure chambers, and supply means of supplying pressure fluid to any selected one or all of said pressure chambers whereby to effect controlled swivelling of said nozzle member, the said segmental chambers and supply means constituting the said actuating means.

Optionally, said walls are constituted by respective pawls provided with respective ball pivots slidable in respective circumferential grooves in the housing.

The actuating means may incorporate a shuttle valve which controls the supply of pressure fluid to said one chamber.

Preferably the housing forms part of a rocket engine, the pressure fluid being a propellant for said engine.

The said surfaces may be part-spherical.

The scope of the invention also includes a rocket engine having a jet nozzle assembly as set forth above.

Figure 2:
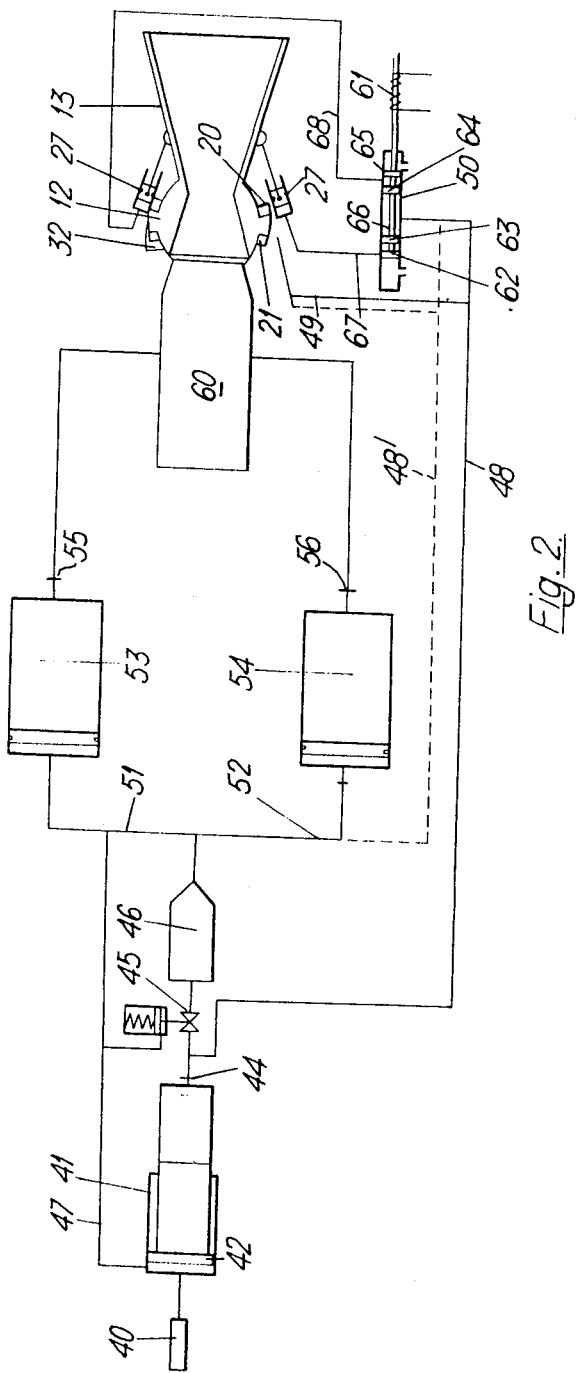

The invention will be illustrated, merely by way of example, in the accompanying drawings, in which:

FIG. 1 is an axial section of a first embodiment of a jet nozzle assembly for a rocket engine in accordance with the present invention, FIG. 2 is a schematic diagram illustrating a control system associated with the jet nozzle assembly shown in FIG. 1, FIG. 3 is an axial section along the line 3—3 of FIG. 4 through a jet nozzle assembly according to a further embodiment of the present invention, FIG. 4 is a perspective view of the jet nozzle assembly shown in FIG. 3, but with the housing omitted for clarity, and FIG. 5 is a schematic diagram illustrating a control system for use with the jet nozzle assembly of FIGS. 3 and 4.

Referring to the drawings, and more particularly to FIGS. 1 and 2, a jet nozzle assembly 10 for a rocket engine comprises a tubular housing 11 which forms part of the combustion chamber of the rocket. The downstream end of the housing 11 is formed as a bearing 12 having a concave, part-spherical bearing surface supporting for universal swivelling movement a convergent-divergent nozzle member 13 having at its upstream end an outer peripheral surface of part-spherical shape complementary to the bearing surface of the bearing 12. Although only one such nozzle member 13 is shown, it should be understood that a cluster of such nozzle members may be provided.

The bearing 12 is provided with a pair of axially spaced apart annular grooves in which are respectively disposed annular seals in the form of O-rings 14.

In between the pair of O-rings 14 the bearing 12 is provided with an annular cavity 15 the radially outer wall of which is of part-spherical shape. The cavity 15 is adapted to be supplied with a pressure fluid through an inlet 16 which communicates with the cavity 15 and there is also provided a vent 17 to atmosphere to allow for leakage of pressure fluid past a seal 18 which is provided at the radially outer end of an annular flange 19 which is integral with an extends radially from the nozzle member 13. The flange 19 thus acts as a piston moving in a cylinder defined by the cavity 15. The flange 19 divides the cavity 15 into two annular chambers 20 and 21, the chamber 20 communicating directly with the inlet 16.

The housing 11 is provided with a bracket 26 on which is mounted at least one actuator 27 of the ram type by which the inclination of the axis of the nozzle member 13 to the longitudinal axis 25 of the housing 11 can be changed. Where the actuator 27 is of the double-acting kind, a single actuator may be sufficient to effect inclination and swivelling of the nozzle member 13, but where actuators of the single-acting kind are provided, as shown, a pair of such actuators disposed diametrically opposite around the nozzle member 13 is required. It will be noted that the actuator 27 includes a piston member 28 pivotally connected to one end of a piston rod 29 the other end of which is secured at 30 in a pivotable manner to the nozzle member 13. In FIG. 1, the pressure fluid inlet and outlet connections to the actuator 27 are not shown.

Returning to the bearing member 12, it will be seen that the chamber 20 communicates by way of a conduit 32 with an annular groove 33 located in the bearing member 12 at the bearing surface thereof. Thus, by a suitable choice of the pressure fluid, the pressure fluid can not only serve to exert hydrostatic pressure on the flange 19 in the chamber 20, but it can also serve as a coolant and/or lubricant for the interengaging curved surfaces of the bearing member 12 and the nozzle member 13 respectively.

It will be appreciated that in operation a propulsive jet at a high temperature and pressure will flow through the hollow interior of the nozzle member 13 and the jet will have the effect of tending to set up frictional opposition to any swivelling movement of the nozzle member 13. However, by admitting pressure fluid at a suitable pressure into the chamber 20, the effect of the propulsive jet just described can be substantially reduced or eliminated, since the hydrostatic pressure in the chamber 20 and acting on the flange 19 will act in opposition to the pressure exerted by the propulsive jet on the convergent part of the interior surface of the nozzle member 13. Moreover, the conduit 32 enables the pressure fluid to serve also as a coolant and/or lubricant to enhance the efficiency and operational life of the swivelling nozzle member 13.

Turning now more particularly to FIG. 2, there is shown an initiator 40 connected to a fuel tank 41 containing a monopropellant, in which tank 41 is a differential area piston 42. Downstream of the tank 41 is a burster disc 44, a flow control valve 45 and a gas generator 46. The valve 45 is also connected by way of a line 47 to that side of the fuel tank 41 which has the larger area face of the piston 42 therein.

Between the burster disc 44 and the control valve 45 there is a line 48 branching off to a shuttle valve 50 described in more detail below. The downstream end of the gas generator has two branch lines 51 and 52 which are respectively connected to an oxidant tank 53 and to a fuel tank 54. Each of these tanks has a respective burster disc 55 and 56 at its downstream end from which fluid is passed into the combustion chamber 60 of the rocket engine.

The shuttle valve 50 is controlled by a solenoid 61 or it may be motor-driven. It includes four pistons 62 to 65 mounted on a common rod 66 which pistons respectively control output lines 67, 68 which are respectively connected to the actuators 27 located on diametrically opposite sides of the housing 11. The return flow from the actuators 27 is not shown in FIG. 2. In addition a line 49 branches off from the line 48 to supply pressure balancing pressure fluid to the chamber 20. Thus, as can be seen from FIG. 2, the monopropellant supplied to the combustion chamber 60 of a rocket engine is also used as the pressure fluid supplied to the chamber 20 to oppose frictional moments set up due to the propulsive jet, and moreover the monopropellant is also used for cooling and/or lubricating the interengaging bearing surfaces of the bearing 12 and the nozzle member 13.

As an alternative to the use of monopropellant liquid through the line 48 to the chamber 20 and to the inlet of the shuttle valve 50, dotted lines indicate an alternative solution in which gas is used as the pressure fluid, the gas being taken from the line 52 to a line 48' and thence to the actuators 27 and the chamber 20.

Referring now to the embodiment shown in FIGS. 3 to 5, in which similar parts have been allotted similar reference numbers, the external actuators 27 have been eliminated and instead there is provided a pressure balanced internally actuated universally swivelling nozzle member 13.

The arrangement for pressure balancing the nozzle member by means of an integral flange 19 and pressure chambers 20, 21 in this embodiment is rather similar to that in the previous embodiment and will not be described again in detail.

In this embodiment, however, the annular chamber 20 is sub-divided into, e.g. four chambers 70 by means of four equi-angularly spaced apart spherically curved pawls 71. These pawls 71 can be seen best in FIG. 4.

The pawls 71 are secured to the outer bearing surface of the nozzle member 13 downstream of the annular flange 19, the outer bearing surface being provided with slots 73 in which the pawls 71 engage to hold the latter against circumferential displacement due to differential pressure between a given pair of adjacent chambers 70, as will become more clear below. In addition, the flange 19 is also provided with substantially axially extending slots 75 to allow movement thereinto of the pawls 71, and thus to allow full included angular movement of the nozzle member 13.

At the downstream end of each pawl 71 there is provided a respective ball pivot 76 set in the respective part-circumferential grooves 77 in the bearing 12.

In this way, the pressurized chamber 20 at the rear face of the flange 19 has been divided into four chambers 70 each of which may receive pressure fluid at different pressures whereby to enable internally initiated swivelling movement of the nozzle member 13.

Referring now to FIG. 5, the control system shown therein resembles that of the system shown in FIG. 2 and only the difference will be commented upon. The valve 45a is a pressure reducing valve introduced between the monofuel tank 41 and the gas generator 46 and as before a branch line 48 supplies the propellant to a shuttle valve 50 which in this embodiment is driven by a motor shown schematically at 80. The valve 50 is provided with two pistons 62' and 63' and is provided with a by-pass conduit 81 which in turn feeds a conduit 32 terminating in an annular manifold 33 at the bearing interface of the nozzle member 13 and the bearing 12. A further conduit 85 extends between the conduit 85 and each slot 75 to cool and lubricate the pawls.

Although FIG. 5 only shows one shuttle valve 50, in fact two such valves 50 are provided, each having respective output lines 67, 68, each output line being connected to one of the four quadrants or chambers 70.

It will be understood that as soon as frictional resistance is overcome and pressure fluid is expelled from a given chamber 70, the shuttle valve or valves 50 may be moved to the neutral position to maintain the maneuver. The vector position of the nozzle will be maintained if the supply of pressure fluid is equal to each of the chambers 70. Actuation about four axes at 45° to each other is achieved by means of expelling pressure fluid from either one or a given pair of adjacent two chambers 70. As in the previous embodiment, dotted lines indicate the alternative of the pressure fluid being gaseous, rather than liquid.

It will be appreciated that the above-described preferred embodiments of the present invention provide a jet nozzle assembly in which satisfactory universal swivelling of the jet nozzle members 13 is achieved in spite of the high temperature and pressure conditions in operation, and in which a long operational life is achievable. In addition, the propellant serves the additional functions of coolant, lubricant, pressure fluid for balancing the pressures on the swivelling nozzle, and finally in the embodiment of FIGS. 3 to 5 it also provides for actuation of the swivelling movement of the nozzle member 13. Moreover, it will be appreciated that leakage of propulsive fluid between the bearings and the complementary surfaces on the nozzle member are substantially prevented, the bearing and the complementary surfaces are kept cool thereby allowing the O-rings 14 to be made of conventional materials, and as far as the first embodiment is concerned, the load required by the actuator is substantially reduced which enables accurate vector control.

A still further advantage of the illustrated embodiments of the invention is that any sealing fluid flowing between the bearing and the complementary surfaces is subsequently injected into the interior of the combustion chamber at the upstream end of the nozzle where it will provide a boundary layer within the nozzle member. This boundary layer will act to cool the inside of the nozzle member itself and to protect it from the propulsive jet, which may be of considerable importance where the jet includes corrosive constituents.

Moreover, since the sealing fluid is a propellant, the flow of sealing fluid can be synchronized with the engine firing sequence and thus no additional control system for the sealing fluid may be necessary.

Although a convergent-divergent nozzle member is illustrated and has been described, the nozzle may of course be of annular shape and may be purely convergent.

We claim:

1. A jet nozzle assembly comprising a housing having a curved bearing surface, a seating provided by said bearing surface, a universally swivellable nozzle member through which in operation a propulsive jet may flow, a complementary surface on said universal nozzle complementary to the bearing surface, sealing means between the said surfaces, actuating means for causing swivelling of said nozzle member relative to said housing, conduit means for supplying a fluid to said surfaces, a part secured to said nozzle member, and pressure responsive means for applying, in operation, hydrostatic pressure to said part so as to reduce or eliminate frictional opposition to its swivelling movement due to said propulsive jet, said pressure responsive means including an annular flange on said nozzle member which flange is in sealing and sliding engagement with a cavity defined in said bearing surface so as to divide said cavity into two annular chambers, and means for supplying pressure fluid to one of said chambers.

2. An assembly as claimed in claim 1 wherein the pressure fluid serves as a coolant and/or lubricant as well as the said fluid, the said conduit means receiving its supply of pressure fluid from said one chamber.

3. An assembly as claimed in claim 1 wherein said actuating means includes at least one ram connected to said nozzle member.

4. An assembly as claimed in claim 3 wherein each ram is pressurized by said pressure fluid.

5. An assembly as claimed in claim 1 wherein said one annular chamber is divided into a plurality of equi- angularly spaced apart segments separated by respective walls each of which is pivotally connected to said housing and connected to said flange so as to be slidably movable relative thereto, the said segments defining therebetween pressure chambers, and supply means for supplying pressure fluid to any selected one or all of said pressure chambers whereby to effect controlled swivelling of said nozzle member, the said segmental chambers and supply means constituting the said actuating means.

6. An assembly as claimed in claim 5 wherein the said walls are constituted by respective pawls provided with respective ball pivots slidable in respective circumferential grooves in the housing.

7. An assembly as claimed in claim 1 wherein the actuating means incorporates a shuttle valve which controls the supply of pressure fluid to said one chamber.

8. An assembly as claimed in claim 1 wherein the housing forms part of a rocket engine, the pressure fluid being a propellant for said engine.

9. An assembly as claimed in claim 1 wherein the said surfaces are part-spherical.

10. A rocket engine having a jet nozzle assembly as claimed in claim 1.

* * * * *